US005872634A

United States Patent [19]

Kunz

[11] Patent Number: 5,872,634

[45] Date of Patent: Feb. 16, 1999

[54] OPTICAL SMOKE DETECTOR OPERATING IN ACCORDANCE WITH THE EXTINCTION PRINCIPLE

[75] Inventor: Peter Kunz, Gossau, Switzerland

[73] Assignee: Cerberus AG, Maennedorf, Switzerland

[21] Appl. No.: 96,304

[22] Filed: Jun. 12, 1998

[30] Foreign Application Priority Data

Jun. 16, 1997 [EP] European Pat. Off. .............. 97109747

[51] Int. Cl.[6] .................................................... G01N 21/00

[52] U.S. Cl. .......................... 356/438; 250/575; 356/394

[58] Field of Search .................................... 356/438, 394; 250/575

[56] References Cited

U.S. PATENT DOCUMENTS 5,381,130 1/1995 Thuillard et al. ....................... 356/438
5,694,208 12/1997 Ichikawa ................................ 356/438
5,751,216 5/1998 Narumiya ................................ 356/438

*Primary Examiner*—Robert Kin
*Assistant Examiner*—Reginald A. Ratliff
*Attorney, Agent, or Firm*—Baker & Botts, L.L.P.

[57] ABSTRACT

The smoke detector includes a light source (1), a measurement section (3) with a measuring receiver (5), a reference section (2) with a reference receiver (4), and an analyzer circuit (6) connected to the receivers. The receivers are of like construction and receive like amounts of radiation from the light source (1). A difference signal ($\Delta I$) formed from the current signal ($I_r$) of the reference receiver and the current signal ($I_m$) of the measuring receiver is fed to the analyzer circuit. A reference current ($I_k$) is superimposed upon the current signal ($I_r$) of the reference receiver, and the light source is connected to a control circuit and regulated by the control circuit for compensation of the reference current ($I_k$) by the reference current signal ($I_r$). The difference signal ($\Delta I$) is superimposed with a compensation signal ($I_k'$) for zero compensation.

11 Claims, 1 Drawing Sheet

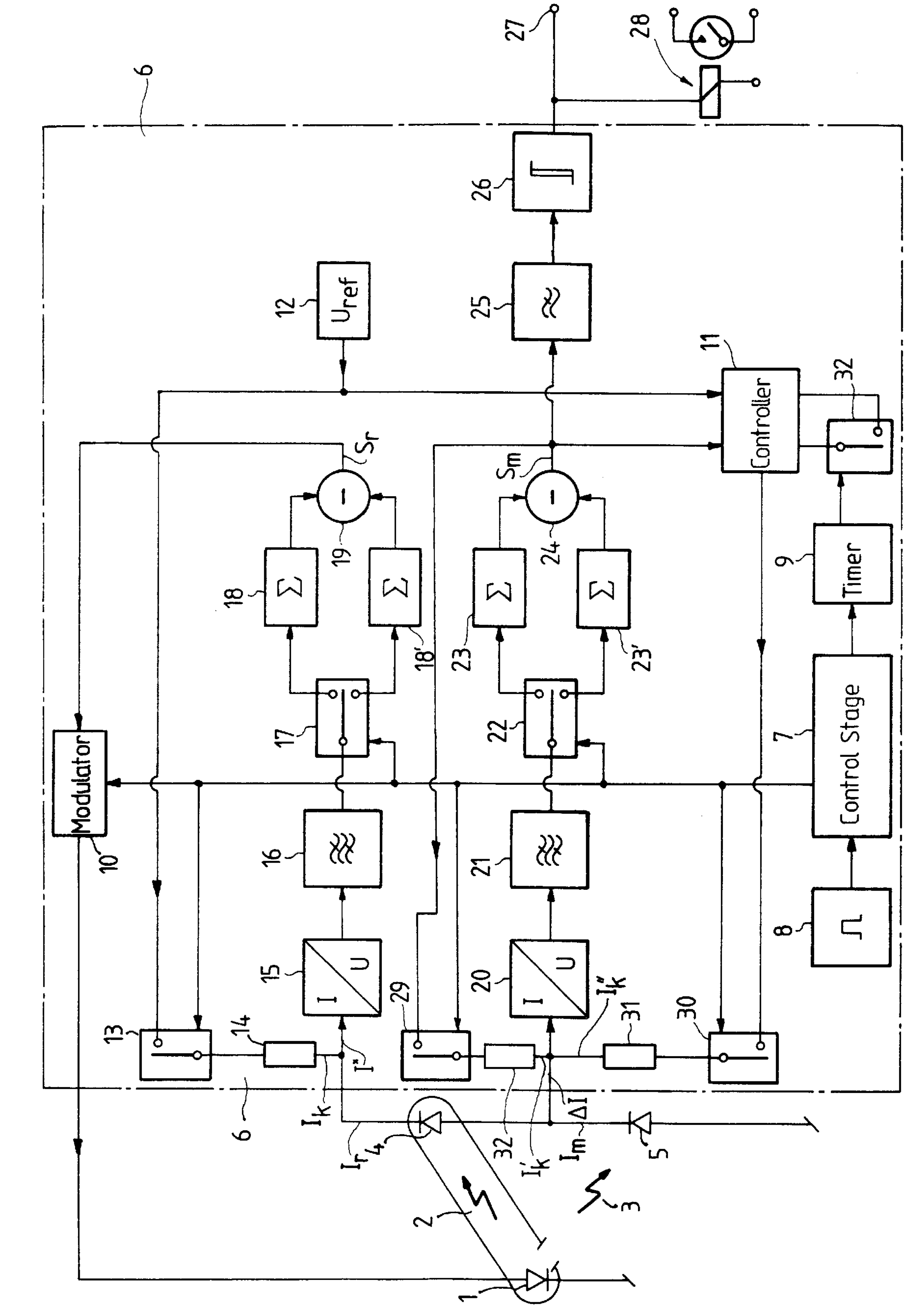
Modulator
Controller
Timer
Control Stage
Uref

OPTICAL SMOKE DETECTOR OPERATING IN ACCORDANCE WITH THE EXTINCTION PRINCIPLE

TECHNICAL FIELD

The present invention relates to an optical smoke detector operating in accordance with the extinction principle, including a light source, measuring and reference receivers, and an analyzer circuit connected to the receivers.

BACKGROUND OF THE INVENTION

In the extinction measuring method, a light beam is transmitted along a measurement section which is accessible to ambient air potentially including smoke, and a sensor signal is compared with a value which corresponds to the absence of smoke in the measurement section. As both scattering and absorption of light by smoke particles contribute to light attenuation or extinction, and as light is scattered by bright particles and absorbed by dark particles, the extinction measuring method has relatively uniform sensitivity to different types of smoke particles and is equally suitable for the detection of smouldering fires (bright particles) and open fires (dark particles).

Smoke detectors operating in accordance with the extinction principle are used mainly for monitoring long measurement sections, e.g. in tunnels or warehouses, where they include separate components which are accommodated in separate housings. One housing includes a light source and a light receiver, and the other has a reflector which reflects the beam emitted from the light source back onto the receiver. An electrical signal from the receiver is compared with a predetermined alarm threshold value, e.g. corresponding to 4%/m extinction or 96%/m transmittance of a reference transmission effected at a reference time.

When the extinction measuring method is employed in spot detectors, i.e. smoke detectors accommodated in a single housing, the measurement section is much shorter, and greater sensitivity is required of the transmission measurement. For example, for a 10-cm measurement section, an alarm threshold of 4%/m corresponds to transmission of 99.6% as compared with the reference transmission. If transmission values below the alarm threshold are to be triggered, values of e.g. 99.96% transmission must be detectable, which requires a very high degree of stability of the electronic, optoelectronic and mechanical components of the detector.

To improve detector stability it is known to use a second light receiver for the reference measurement of the light source intensity, whereby light intensity changes can be detected. Also, a second light source can be used so that determination of a measurement value does not depend on the sensitivity of the light receivers. A typical arrangement of this type takes the form of an optical bridge including two light sources and two light receivers, with light from each of the light sources being directed to each of the receivers. Such optical bridges are disclosed in U.S. Pat. No. 4,017,193 and Swiss Patent Document A-643061, for example.

The disclosed optical bridges are based on the assumption that light emitted from the light source is uniformly distributed for passage across the respective air sections to the light receivers, which assumption is valid only in rare, ideal situations. In practice, contamination of the device, temperature fluctuations, and especially changes in the emission characteristics of the light sources will change the distribution of light intensities between the two air sections to an extent which may mimic a change in air transmittance.

SUMMARY OF THE INVENTION

A smoke detector in accordance with the invention, operating in accordance with the extinction principle, (i) has a high level of stability with respect to changes in component parameters such as tolerances, ageing effects and temperature coefficients, (ii) is insensitive to changes in the distribution of light intensities between measurement and reference sections, and (iii) is of compact design. In such a detector, measurement and reference receivers are alike, and measurement and reference sections have optical paths such that the receivers receive like amounts of radiation from the light source. From receiver current signals, a difference signal is formed and fed to an analyzer circuit for compensation to zero.

In a preferred first embodiment of a smoke detector in accordance with the invention, a reference current is superimposed on the current signal of the reference receiver. The light source is connected to a control circuit which controls the light source for full compensation of the reference current by the photocurrent of the reference receiver. By methodical zero compensation, the influence of the aforementioned component parameters is minimized. Also as a result of zero compensation, the risk of uneven light intensity distribution between measurement and reference sections (which risk is small to begin with on account of the use of a single light source) is reduced further still. Moreover, with the invention, optical aids such as reflectors or lenses can be dispensed with, and a compact construction can be realized.

A preferred second embodiment of the smoke detector in accordance with the invention provides for adjustment of the zero compensation control for the difference signal. Such adjustment ensures that, under normal operating conditions, the current signals from the light receivers are compensated to zero even when the light receivers are not exactly at the same temperature, and even if they differ within production tolerances, for example. Even deposits of dirt or dust on the measuring receiver of the measurement section, which is accessible to ambient air, cannot hinder the measurement and cannot mimic a change in air transmittance.

BRIEF DESCRIPTION OF THE DRAWING

The FIGURE is a circuit block diagram of an exemplary embodiment of a smoke detector in accordance with the invention.

DETAILED DESCRIPTION

The FIGURE shows the optoelectronic and electronic components of the exemplary embodiment. The well-known mechanical components of a spot detector are not shown, such as the detector base, detector insert and detector cover.

The exemplary smoke detector includes a light source 1, preferably in the form of an LED, a reference section 2 shielded from the ambient air, a measurement section 3 accessible to the ambient air, a reference receiver 4 receiving light pulses from the light source 1 having passed through the reference section 2, a measuring receiver 5 receiving light pulses from the light source 1 having passed through the measurement section 3, and an analyzer circuit 6 connected to the receivers 4 and 5.

The receivers 4 and 5 include respective photodiodes of the same construction and receiving the same amounts of radiation from the light source 1 on account of a suitable design of the optical paths of reference section 2 and measurement section 3. Thus, the photocurrents resulting in the receivers 4 and 5 as a function of the radiation from the light source 1 are of equal magnitude, and the difference between the photocurrents remains zero until the optical properties of the measurement section 3 are changed by an external influence, e.g. by smoke particles entering into the measurement section. Then, the difference between the photocurrents is no longer zero and increases as a function of turbidity or extinction.

In case the receivers 4 and 5 are at different temperatures, the temperature coefficient of their conversion factor should be as small as possible. The conversion factor is wavelength dependent. Experimentally it was found that, depending upon the diffusion profile of the photodiodes of the receivers 4 and 5, a shorter wavelength, e.g. red, is preferable over a longer wavelength, e.g. infrared.

The analyzer circuit 6 includes a digital control stage 7 which is clocked by a clock generator 8 and is connected to a timer 9 and to a modulator 10 which precedes the light source 1, and a controller 11. The modulator 10 effects suitable modulation of the radiation emitted from the light source 1. Preferably, the radiation consists of a continuous series of pulses with inter-pulse periods so that the reference section 2 and the measurement section 3 are irradiated with pulsating infrared light. The controller 11 is connected to a reference voltage source 12 which supplies a reference voltage $U_{ref}$.

A square-wave current signal $I_k$ is superimposed on the output signal $I_r$ of the reference receiver 4 via a switch 13 controlled by the control stage 7 and via a resistor 14, and the resulting current signal I* is fed to a current/voltage converter 15 for conversion into a voltage. The level of the square-wave pulses fed via the switch 13 is determined by the reference voltage $U_{ref}$ and by the value of the resistor 14, both of which values are very stable. The voltage generated in the current/voltage converter 15 is substantially freed of d.c. voltage and undesired frequency components by a filter 16, and the thus freed output signal of the filter 16 is fed via a separating filter 17 alternately to one or the other of two stores 18 and 18'.

The separating filter 17 is controlled by the control stage 7 such that, during the transmission period of the pulses of the radiation emitted from the light source 1, the signal supplied from the filter 16 is fed to the one store, e.g. the store 18, and, during the inter-pulse periods, the signal is fed to the other store, e.g. the store 18'. The separating filter 17 is preferably implemented as a controlled switch.

As the store 18 contains the signal during the transmission period, and thus contains the signal I* formed from the signal $I_r$ of the reference receiver 4 and from the current pulses $I_k$ fed via the switch 13 and the resistor 14 together with residual interference signals, and the store 18' contains the signal formed from the inter-pulse periods, and thus contains only the residual interference signals, the interference signals can be eliminated simply by forming the difference between the signals of the stores 18 and 18' in a subtraction stage 19 connected downstream of the stores.

The useful signal $S_r$ of the reference receiver 4 obtained as a result of difference formation in the stage 19 is fed to the modulator 10 which is controlled by the digital control stage 7 and which regulates the level of the light pulses emitted from the light source 1 such that the photo current $I_r$ generated by the reference receiver 4 exactly compensates the current pulses $I_k$ supplied by the switch 13 via the resistor 14, so that the current I* becomes zero. As components age and temperature coefficients change by as much as 10%, this circuit maintains a maximum control deviation of the photocurrent on the order of parts per million.

The output signal $I_m$ of the measuring receiver 5 is subtracted from the output signal $I_r$ of the reference receiver 4, and the difference signal ΔI thus obtained between the currents $I_r$ and $I_m$ is fed to a current/voltage converter 20 for conversion into a voltage. This voltage is substantially freed of d.c. voltage and undesired frequency components by a filter 21, and the thus freed output signal of the filter 21 is fed via a separating filter 22 alternately to one or the other of two stores 23 and 23'.

The separating filter 22 is controlled by the control stage 7 such that, during the transmission period of the pulses of the radiation emitted from the light source 1, the signal supplied from the filter 21 is fed to the one store, e.g. the store 23, and is fed to the other store, e.g. the store 23' during the inter-pulse periods. The separating filter 22 is preferably implemented as a controlled switch.

As the store 23 contains the signal during the transmission period and thus contains the signal formed from the output signal of the current/voltage converter 20 together with residual interference signals, and the store 23' contains the signal from the inter-pulse periods and thus contains only the residuals interference signals, the interference signals can be eliminated simply by forming the difference between the signals from the stores 23 and 23' in a subtraction stage 24 connected downstream of the stores.

The output of the stage 24 is connected to the controller 11, to a switch or modulator 29, and to a filter 25, all of which are supplied with the useful signal $S_m$. Via the switch 29, the useful signal $S_m$ is fed to a resistor 32 which converts the voltage $S_m$ into a current $I_k'$. This current is superimposed upon the current ΔI, and their sum is fed to the input of the current/voltage converter 20. In correspondence with the phase of $I_k'$, a control loop negative feedback is formed, resulting in zero compensation of the difference signal ΔI.

The output of the filter 25 is connected to a comparator 26 which, at a predetermined level of the useful signal $S_m$, produces an alarm signal to an alarm output 27 of the detector. The alarm signal can be analyzed further, e.g. checked for plausibility, in the detector or in a control center, or can be passed without further processing to trigger an alarm in the control center. A relay 28 is included whose contacts facilitate a potential-free evaluation of the alarm signal.

Even if the temperature coefficient of the conversion of radiation into photocurrent can be adjusted to near zero, at a suitably selected wavelength of the light source 1, resulting in temperature equality of the reference and measuring receivers 4 and 5, there remain problems with the tolerances of the mechanical parts of the detector and the production tolerances of the components. Also, deposits of dust and dirt on the measuring receiver 5 which, in contrast to the protected reference receiver 4, is freely accessible to the surrounding air, can appreciably influence the properties of the measuring receiver 5. On account of such problems, the difference signal ΔI between the photocurrents $I_r$ and $I_m$, respectively of the reference receiver 4 and the measuring receiver 5, will be zero only infrequently and only for limited time periods at best, which stands in the way of the desired high degree of stability and immunity of the detector to changes in component parameters and variations in light intensity distribution between measurement and reference sections.

These problems can be overcome by adjustment using the controller 11 to superimpose on the photocurrent ΔI an additional current $I_k''$ such that the current supplied to the current/voltage converter 20 is always zero. The current $I_k''$ is superimposed via a switch 30 controlled by the control stage 7 and followed by a resistor 31.

The controller 11 is connected to a further switch 32 for changing the control response such that even a very gradually arising or smouldering fire is reliably detected. The change is effected when the supply voltage has been connected to the detector and after a start-up time predetermined by the timer 9. For reliable detection of extremely slowly arising, smouldering fires, the controller 29 advantageously takes the form of a digital controller, implemented in a microprocessor, for example.

The described spot detector operating in accordance with the extinction principle is highly stable with respect to drift due to component ageing, and highly immune to variations in the distribution of light intensity in the optical paths in the measurement and reference sections. Furthermore, the detector is substantially insensitive to deposits of dust and dirt at the measuring receiver which is accessible to the ambient air.

The high degree of stability with respect to drift, and the high degree of immunity with respect to variations in light intensity distribution are achieved by regulation of the light source and by zero compensation. Insensitivity to deposits on the measuring receiver is achieved by adjustment using the controller 11. Such stability, immunity and insensitivity are conducive to use of the extinction principle in a spot detector which is superior to known scattered light detectors in detecting open as well as smouldering fires, as the extinction method is responsive to light scattering by bright smoke particles (smouldering fires) as well as to light absorption by dark smoke particles (open fires).

I claim:

1. An optical smoke detector comprising:

a light source a reference section substantially shielded from ambient air and including a reference receiver which is configured and disposed to receive a reference amount of light from the light source and to generate a reference current signal in response to the reference amount of light;

a measurement section in communication with the ambient air and including a measuring receiver which is like the reference receiver and which is configured and disposed to receive a measurement amount of light from the light source and to generate a measurement current signal in response to the measurement amount of light, with the measurement section and the reference section being such that the measurement amount of light is substantially the same as the reference amount of light when the measurement section includes clear air; and an analyzer circuit operationally coupled to the receivers and comprising a compensator circuit for zero compensation of a difference signal formed from the reference current signal and the measurement current signal.

2. The smoke detector according to claim 1, wherein the analyzer circuit comprises:

means for superimposing a reference current upon the reference current signal; and a control circuit for controlling the light source for zero compensation of the reference current by the reference current signal.

3. The smoke detector according to claim 1, wherein the compensator circuit further comprises means for adjusting the zero compensation of the difference signal.

4. The smoke detector according to claim 3, wherein the means for adjusting the zero compensation of the difference signal comprises means for superimposing on the difference signal a first compensation signal derived from the measurement current signal.

5. The smoke detector according to claim 4, wherein the analyzer circuit comprises a control loop for back-feeding the measurement current signal.

6. The smoke detector according to claim 3, wherein the means for adjusting the zero compensation of the difference signal comprises means for superimposing on the difference signal a second compensation signal under control of a controller for zero compensation.

7. The smoke detector according to claim 6, wherein the analyzer circuit comprises:

a modulator connected to a control stage for pulse modulation of the light source; and three switches connected to the control stage for superimposing on the reference current signal the reference signal and for superimposing on the difference signal the first and second compensation signals.

8. The smoke detector according to claim 7, further comprising means for forming a further signal from the reference current signal and the reference signal and feeding the further signal to one of two stores via a controlled first separating filter connected to the control stage, wherein the stores are followed by a subtraction stage, and wherein the output of the subtraction stage is connected to the modulator.

9. The smoke detector according to claim 8, further comprising means for synchronizing the feeding of the further signal with modulation of the light source so that storing is in one of the stores during pulse periods and in the other of the stores during inter-pulse periods.

10. The smoke detector according to claim 7, further comprising means for feeding a signal formed from the difference signal and the compensation signals to one of two further stores via a controlled second separating filter connected to the control stage, wherein the further stores are followed by a further subtraction unit, and wherein the output of the further subtraction unit is connected to an alarm output of the detector, to the controller, and to a switch for superimposing the first compensation signal.

11. The smoke detector according to claim 10, further comprising means for synchronizing the feeding of the signal formed from the difference signal and the compensation signals with modulation of the light source so that storing is in one of the further stores during pulse periods and in the other of the further stores during inter-pulse periods.

* * * * *